April 22, 1930.  F. F. LINN ET AL  1,755,740
REVERSIBLE REAR VIEW REFLECTOR
Filed May 21, 1927
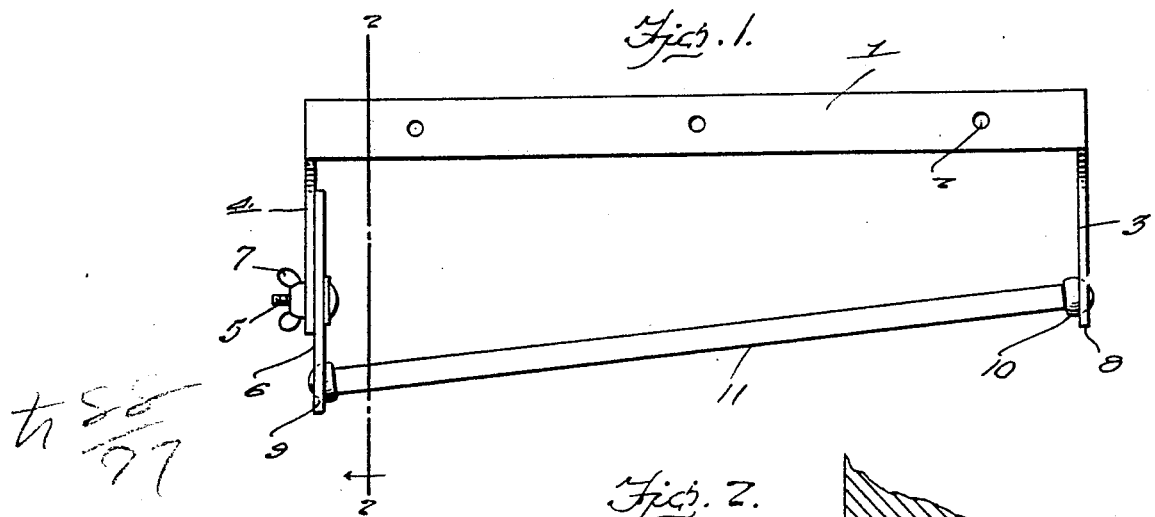
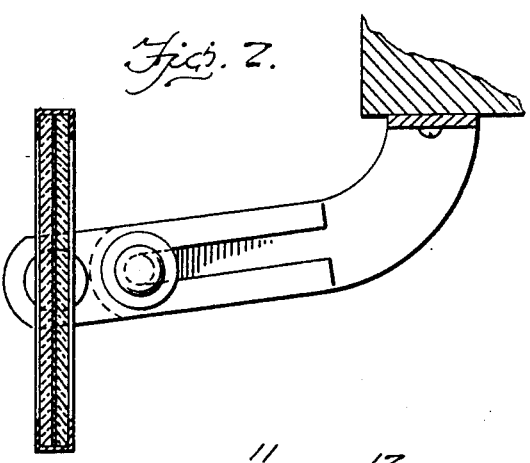
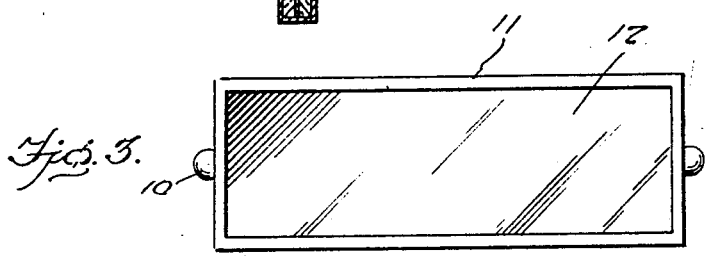
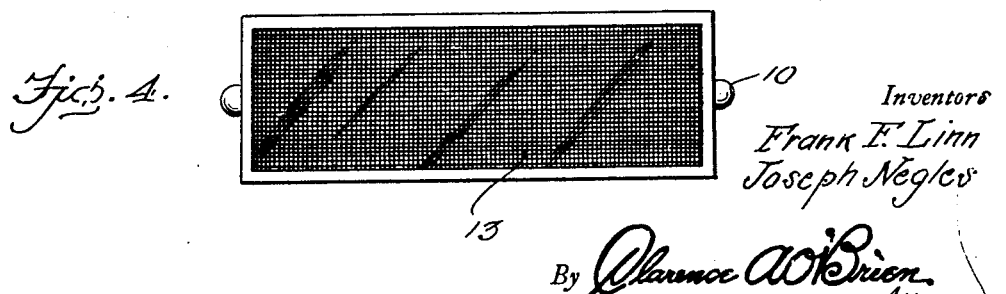
Inventors
Frank F. Linn
Joseph Negley
By Clarence A. O'Brien
Attorney Patented Apr. 22, 1930

1,755,740

UNITED STATES PATENT OFFICE

FRANK F. LINN AND JOSEPH NEGLES, OF NORTH BEND, OREGON, ASSIGNORS OF PART INTERESTS TO CHARLES L. SHUPPY, THOMAS N. CAMPBELL, AND JULIUS ROSS, ALL OF OAKLAND, CALIFORNIA

REVERSIBLE REAR-VIEW REFLECTOR

Application filed May 21, 1927. Serial No. 193,225.

Our present invention pertains to rear view reflectors such as employed upon automobiles; and it contemplates the provision of a reversible rear view reflector possessed of the practical advantages hereinafter ascribed to the same.

The improvement resides in the device as hereinafter described and definitely claimed.

In the accompanying drawing, forming part of this specification:

Figure 1 is a plan view of the reflector constituting the preferred embodiment of our invention.

Figure 2 is an enlarged vertical section taken on the plane indicated by the line 2—2 of Figure 1, looking toward the left.

Figure 3 is an elevation showing the mirror side of the reversible member.

Figure 4 is an elevation showing the black reflecting side of the reversible member.

Similar numerals of reference designate corresponding parts in all the views of the drawing.

Among other elements our novel device comprises a body bar 1, designed to be attached by screws passed through apertures 2 or if desired, the body bar 1 may be provided with a slot and a clamp employed to hold the said body bar in place, the construction last referred to being more especially designed for use when the device is applied to a closed car.

While the device is shown in horizontal position in Figure 1, it will be understood that the device may be used in either vertical or horizontal positions.

At its opposite ends, the body bar 1 is provided with arms 3 and 4 possessed of resiliency, the arm 4 being longitudinally slotted to receive the shank 5 of a headed and threaded bolt through the medium of which an adjustable resilient section 6 is connected to the arm 4, the said bolt being equipped with a wing nut or other appropriate nut as designated by 7 for the clamping and fixture in the adjustable manner of the section 6 to the arm 4. The arm 3 and the adjustable section 6 are provided with apertures 8 and 9 respectively. These apertures 8 and 9 are designed to receive and seat rounded projections 10 at the ends of a reversible member 11, the resiliency of the arms on the body bar and the tendency of said arms to spring inwardly or toward each other serving effectively to tightly hold the reversible member 11 against shaking or causal turning movement and yet permitting of the said member 11 being pointed and reversed when a little stress is applied thereto.

At one side the member 11 is provided with a mirror 12 for daylight use, and at its opposite side the member 11 is provided with a black reflecting surface 13, the black reflecting surface 13 being designed for night use and being calculated to eliminate the glare and annoyance caused by a mirror used at night. In this connection it will be understood that the member 11 will be adjusted so as to display the mirror 12 at its rear side during the daytime, while the member 11 will be turned about its axis so as to display the black reflecting surface 13 at its rear side in the night time, it being manifest in this connection that when the black reflecting surface 13 is positioned as indicated, the driver of the automobile will be enabled to see the light of an automobile in his rear without being blinded by the said light.

Notwithstanding the practical advantages ascribed to our novel rear view reflector, it will be appreciated that the reflector is simple and inexpensive in construction and in general well adapted to withstand the usage to which automobile appurtenances are ordinarily subjected; and it will also be appreciated that when properly embellished, the reflector will enhance rather than detract from the finished appearance of an automobile.

Having thus described the invention, what we claim is:—

1. In a rear view reflector for automobiles and the like; an integrally formed reflector mounting and attaching member comprising a body having a central portion arranged for attachment to the automobile and laterally extending arms at and supported by the ends thereof; an extension arm slidably and pivotally secured to one of said arms; and a reversible reflector pivotally carried between said adjustable arm and the other of said first arms by substantially ball and socket bearings, said bearings permitting the removal of the reflector from or the insertion thereof between said arms upon spreading thereof.

2. In a rear view reflector for automobiles and the like; an integrally formed reflector mounting and attaching member comprising a resilient body having a central portion arranged for attachment to the automobile and provided with integral laterally extending arms at the ends thereof; an extension arm adjustably secured to one of said arms; a reversible reflector pivotally carried between said adjustable arm and the other of said first arms by substantially ball and socket bearings and being frictionally held in adjusted position thru the combined resiliency of said portion and arms; said substantially ball and socket bearings for said reflector permitting the removal of the reflector from or the insertion thereof between the arms upon the spreading thereof.

In testimony whereof we affix our signatures.

FRANK F. LINN.
JOSEPH NEGLES.